United States Patent Office 2,781,369
Patented Feb. 12, 1957

2,781,369

PROCESS FOR THE MANUFACTURE OF
11β-ACYLOXY STEROIDS

Eugene P. Oliveto, Bloomfield, and Emanuel B. Hershberg, West Orange, N. J., assignors to Schering Corporation, Bloomfield, N. J., a corporation of New Jersey No Drawing. Application October 22, 1952,
Serial No. 316,324

8 Claims. (Cl. 260—397.45)

The present invention relates to the manufacture of 11-acyloxy derivatives of 11β-hydroxy steroids which have no other substituent in the C-ring, and to the acylated products so obtained.

More particularly, the present invention relates to improved procedures whereby 11β-hydroxy-perhydrocyclopentanophenanthrene compounds having no other substituent in the C-ring, can be converted to the corresponding 11β-acyloxy compounds.

The esterification of the 11β-hydroxyl group of steroid compounds having no other substituent in the C-ring, is desirable for protective purposes in the synthesis of various compounds having important physiological activity, but efforts to acylate such 11β-hydroxyl group have heretofore been unsuccessful. Under the usual conditions of acetylation, such as by the use of acetic anhydride and pyridine, the 11β-hydroxyl group either fails to esterify, or, when a reaction does occur, it results in dehydration, forming a $\Delta^{9,11}$-double bond. In all examples described in the literature, acetylation of an 11β-hydroxyl of steroid compounds has necessitated the presence of a 3,9-epoxide, a 12-ketone, or some other activating neighboring group which must ultimately be eliminated.

We have found a new and simple method for the preparation of the new 11-esters of 11β-hydroxy steroids having no other substituent in the C-ring. Our process consists in treating such 11β-hydroxy steroids with an acetylating agent and with a strong acid catalyst but under otherwise mild conditions. For example, by the use of acetic anhydride or isopropenyl acetate in the presence of p-toluene sulfonic acid at room temperature, the 11β-hydroxysteroids are converted into 11β-acetoxy compounds. These acetylating conditions not only avoid dehydration at the C-11 hydroxyl, but also provide high yields of the desired 11β-acetoxy steroid. This result was entirely unexpected in view of the failure of prior acylating processes to yield the 11β-esters of the specified type of steroids, even under intensive acylation reaction conditions.

Our invention is not limited to acetylation, for with the proper choice of acylating agent, such as propionic, butyric and other anhydrides, other preferably lower aliphatic acyl radicals may be introduced. Also, other strong acid catalysts may be used, such as trichloracetic, benzene sulfonic, sulfuric and perchloric acids. The reaction is a general one and may be applied to any steroid with an 11β-hydroxyl group unactivated by a neighboring substituent. For example, etiocholanes and androstanes having the following structures can be easily prepared from the corresponding 11β-hydroxy compounds:

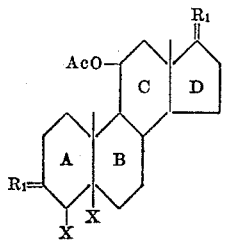

wherein R₁ is a member of the group comprising O;

$$\diagdown_H^{OH} \qquad \diagdown_H^{acyloxy}$$

and $$\diagdown_H^{alkoxy}$$

and X, X are a member of the group comprising H, H and a double bond, the acyloxy and alkoxy groups being preferably lower members of the aliphatic series, like acetoxy, propionoxy, isovaleroxy, methoxy, propoxy, etc., although aromatic derivatives, like benzoyloxy, benzyloxy, etc. are not excluded.

In addition, pregnanes and allopregnanes having the following structures can be prepared from the analogous 11β-hydroxy precursor:

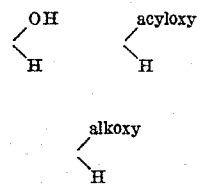

wherein R₁ is as above defined; R₂ is a member of the group comprising H, OH and acyloxy, and X, X are a member of the group comprising H, H and a double bond.

Other hydroxyl groups which may be attached to the steroid nucleus will be acylated in the course of our process. However, as will be shown below, all acyloxy groups with the exception of the 11β-group can be easily removed by alkaline hydrolysis. Our invention, by thus utilizing the resistance of the 11β-acyloxy group to hydrolysis, accordingly provides a novel method for the synthesis of physiologically active 11β-acyloxy compounds related to the adrenal and other hormones, or of intermediates for use in the manufacture of such hormones.

The following equations depict the synthesis of $\Delta^4$-pregnen-11β,17α,21-triol-3,20-dione 11-acetate (compound F 11-acetate):

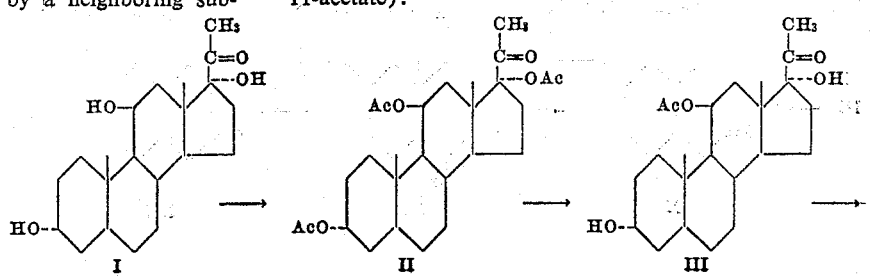

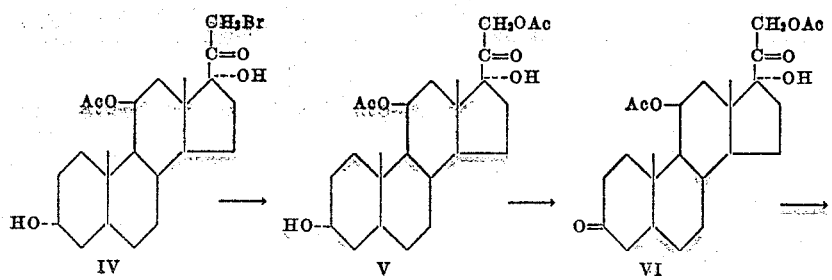

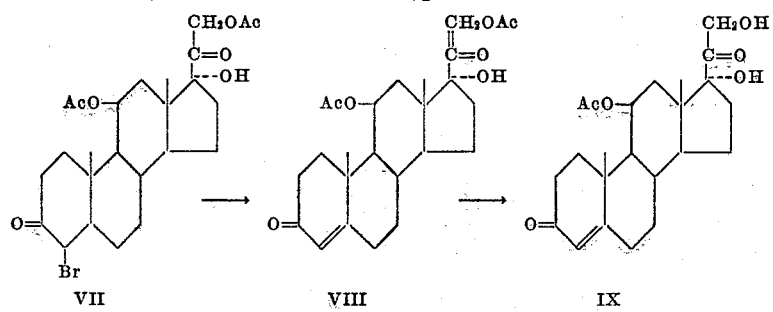

Pregnan-3α,11β,17α-triol-20-one (I) is acetylated with, for example, acetic anhydride and acetic acid in the presence of p-toluene sulfonic acid to yield the triacetate II. Saponification with either hot sodium carbonate solution or aqueous sodium hydroxide removes the C–3 and C–17 acetates to yield pregnan-3α,11β,17α-triol-20-one 11-acetate (III). Bromination of C–21, followed by the usual methods of acetoxylation, yields the pregnantriolone acetate V. Oxidation of the 3-hydroxyl V to give the trioldione diacetate VI can be performed with a variety of oxidizing agents, such as N-bromacetamide, N-bromsuccinimide, potassium chromate and chromic acid. Bromination at C–4 with bromine and acetic acid or by the method described in the co-pending application of Eugene P. Oliveta et al., Serial No. 287,612, for "Process for the Bromination of Steroids," filed May 13, 1952, followed by dehydrobromination in known manner yields the 11,21-diacetate VIII. Hydrolysis with either acid or alkali easily removes the C–21 ester group, yielding compound F 11-acetate (IX).

Alternatively, the 21-bromide IV need not necessarily be converted to the 21-acetate. For example, the reaction of IV with sodium propionate or sodium benzoate yields the 21-propionate and benzoate respectively, which in turn can be carried through the previous set of reactions. Also, hydrolysis of IV with sodium hydroxide will give the 21-hydroxy compound, which can be carried through the remainder of the reaction sequence as the free hydroxyl at C–21, thereby yielding compound F 11-acetate without first going through the 21-ester intermediate VIII.

An analogous procedure can be used for the production of Δ⁴-pregnen-11β, 17α-diol-3,20-dione 11-acetate. By oxidation of the 11-mono-acetate III with one of the usual oxidizing agents, there is obtained pregnandioldione mono-acetate X. Introduction of the Δ⁴ double bond is accomplished by bromination and dehydrobromination in the usual manner to yield XII.

The described invention has a number of important advantages over other processes. The 11β-hydroxyl can now be protected in chemical reactions which were heretofore either very difficult or impossible to perform on 11β-hydroxy steroids. For example, bromination at C–21 in the presence of an 11β-hydroxyl group results in a very small yield of the desired 21-bromide because of the facile oxidation of the 11-hydroxyl group by the brominating mixture. In addition, oxidation of other hydroxyl groups such as that at C–3 in the presence of a C–11 hydroxyl group heretofore was best carried out by means of an Oppenauer reaction. However, this procedure is tedious and the yields are mediocre. By protecting the 11β-hydroxyl group with an ester group, oxidation of the other hydroxyl groups can now be carried out quickly, conveniently and in high yield by means of other common and more efficient oxidizing agents. In addition, all of the active hormones containing an 11β-hydroxyl group can now be converted to the 11β-acetates or homologous esters. These compounds, while qualitatively retaining the original physiological activities, differ considerably in their rates of absorption and thus generate a corresponding change of response of the organism under treatment.

The following examples describe the invention in greater detail but are presented only by way of illustration, and not as indicating the scope of the invention.

EXAMPLE I

*Pregnan-3α,11β,17α-triol-20-one triacetate*

To a solution of 4.0 g. of pregnan-3α,11β,17α-triol-20-one in 100 ml. of acetic acid and 60 ml. of acetic anhydride is added 2.0 g. of p-toluene sulfonic acid. After standing overnight at 25°, the solution is poured into water and the resulting solid collected by filtration, washed with water and dried; wt. 5.16 g., M. P. 187–194°. Recrystallization from acetone-hexane yields 4.5 g. of pregnan-3α,11β,17α-triol-20-one triacetate, M. P. 209–

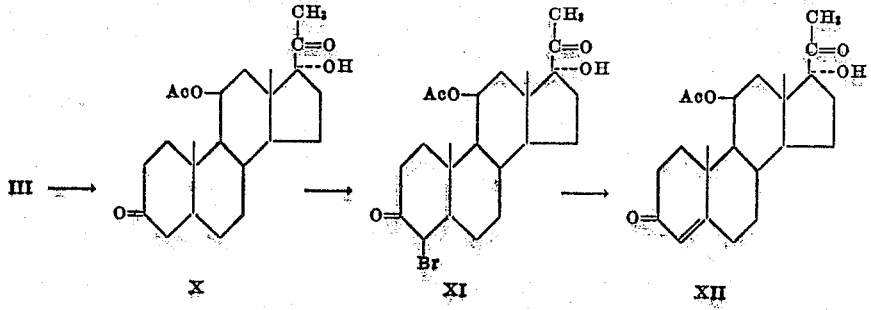

210°, $[\alpha]_D+54.3°$ (chloroform). (The infrared spectrum shows no hydroxyl peak, and integration of the acetate carbonyl frequencies gives a value in agreement with that expected for three acetate groups).

EXAMPLE II

*Pregnan-3α,11β,17α-triol-20-one 11-acetate*

A solution of 7.3 g. of pregnan-3α,11β,17α-triol-20-one triacetate in 585 ml. of C. P. methanol is added to 58 ml. of 1 N aqueous sodium hydroxide and the mixture refluxed one and one-half hours. The excess alkali is neutralized by the addition of 4.5 ml. of acetic acid, and the methanol removed by distillation under reduced pressure. The aqueous mixture is extracted with methylene chloride, and the organic phase washed with water, dried and evaporated. Crystallization from ether yields 4.8 g. of pregnan-3α,11β,17α-triol-20-one 11-acetate, M. P. 110–111° with foaming, $[\alpha]_D+35.6°$ (chloroform). (The infra-red spectrum indicated that only one acetate group remained; since there was no evidence of interaction between the acetate and a ketone carbonyl, the remaining acetate must be C–11.)

Reacetylation with acetic acid, acetic anhydride and p-toluene sulfonic acid, yields the original triacetate, indicating that no dehydration or rearrangement had occurred during the hydrolysis.

The saponification can also be performed with a hot sodium carbonate solution, or with aqueous sodium hydroxide at room temperature.

EXAMPLE III

*Pregnan-3α,11β,17α,21-tetrol-20-one 11,21-diacetate*

A solution of 3.0 g. of pregnan-3α,11β,17α-triol-20-one 11-acetate in 30 ml. of C. P. chloroform is brominated at 27° by the dropwise addition of 1.22 g. of bromine in 15 ml. of C. P. chloroform. After removal of the solvent under reduced pressure, 50 ml. of acetone and 6 g. of potassium acetate are added, and the mixture refluxed for 5 hours. The acetone is removed by distillation under reduced pressure, water added, and the mixture extracted with methylene chloride. The organic extracts are washed with water, dried and evaporated, giving 3.39 g. crude pregnan-3α,11β,17α,21-tetrol-20-one 11,21-diacetate, M. P. 163–172°. Recrystallization from acetonehexane yields 2.0 g., M. P. 175–176°, $[\alpha]_D+78.6°$ (chloroform).

EXAMPLE IV

*Pregnan-11β,17α,21-triol-3,20-dione 11,21-diacetate*

A solution of pregnan-3α,11β,17α,21-tetrol-20-one 11,21-diacetate in 20 ml. of acetone and 4 ml. of water is cooled in an ice bath, and 0.46 g. of N-bromoacetamide is then added. After standing overnight at 5°, the solution is poured into water containing 2 g. of sodium sulfite. The mixture is extracted with methylene chloride, and the extract washed with water, dried and evaporated. Crystallization from aqueous methanol yields 0.33 g. of pregnan-11β,17α,21-triol-3,20-dione 11,21-diacetate, M. P. 180–182°, $[\alpha]_D+81.0°$ (chloroform).

EXAMPLE V

*Δ⁴-pregnen-11β,17α,21-triol-3,20-dione-11-acetate*

A solution of 2.0 g. of pregnan-11β,17α,21-triol-3,20-dione 11,21-diacetate in 10 ml. of methylene chloride, previously saturated with hydrogen bromide, and 10 ml. of t-butanol is cooled to 0°. At this temperature, a solution of 760 mg. of bromine in 10 ml. of methylene chloride and 10 ml. of t-butanol is added over a period of ten minutes. The solution is allowed to warm up to room temperature in order to discharge the residual bromine, and then concentrated under reduced pressure until solids appear. Water is then added and the crude 4-bromopregnan-11β,17α,21-triol-3,20-dione 11,21-diacetate removed by filtration and dried. Pure 4-bromide is obtained by crystallization from aqueous acetone.

A solution of 0.42 g. of semicarbazide hydrochloride and 0.3 g. of sodium acetate in 3.5 ml. of water and 15 ml. of acetic acid is quickly added to a suspension of 1.58 g. of the 4-bromide in 60 ml. of acetic acid while stirring and maintaining a gentle stream of carbon dioxide. After 15 minutes, 3.6 ml. of 1 N sodium acetate in acetic acid is added and the stirring continued for 10 minutes longer. The gas stream is discontinued, and the solution refluxed for 10 minutes. After cooling, water is added and the mixture extracted with methylene chloride. The organic layer is washed with water, dried and evaporated. The crystallization of the residue from acetone-hexane yields Δ⁴-pregnen-11β, 17α, 21-triol-3,20-dione 11,21-diacetate (compound F 11,21-diacetate).

EXAMPLE VI

*Δ⁴-pregnen-11β,17α,21-triol-3,20-dione-11-acetate*

Hydrolysis of the 11β,21-diacetate by refluxing 1 hour with aqueous methanolic sodium bicarbonate gave Δ⁴-pregnen-11β,17α,21-triol-3,20-dione 11-acetate. (Compound F 11-acetate.)

EXAMPLE VII

*Pregnan-11β,17α-diol-3,20-dione 11-acetate*

A solution of 1 g. of pregnan-3α, 11β, 17α-triol-20-one 11-acetate in 10 ml. of acetic acid is treated with 200 mg. of chromium trioxide in 2 ml. of water for 3 hours. After the addition of water, the mixture is extracted with chloroform, and the organic layer washed with sodium carbonate until neutral. The chloroform is removed by distillation, and the residue crystallized from aqueous methanol to yield pregnan-11β,17α-diol-3,20-dione 11-acetate.

EXAMPLE VIII

*Δ⁴-pregnen-11β,17α-diol-3,20-dione 11-acetate*

As described in the previous examples, the pregnandioldione acetate from Example VII is brominated at C-4 by means of bromine in methylene chloride and t-butanol, and hydrogen bromide is eliminated by the semicarbazide procedure to yield Δ⁴-pregnen-11β,17α-diol-3,20-dione 11-acetate.

EXAMPLE IX

*Δ⁴-pregnen-11β,17α-diol-3,20-dione 11,17-diacetate*

The pregnendioldione acetate of Example VIII is acetylated with acetic anhydride and p-toluene sulfonic acid at room temperature to give Δ⁴-pregnen-11β,17α-diol-3,20-dione 11,17-diacetate.

EXAMPLE X

*Pregnan-3α,11β,17α,20β-tetrol tetra-acetate*

One gram of pregnan-3α,11β,17α,20β-tetrol is dissolved in 50 ml. of isopropenyl acetate, and 0.5 g. of benzene sulfonic acid is then added. After standing overnight at room temperature, most of the solvent is removed under reduced pressure and methylene chloride added. The organic extract is washed with sodium carbonate solution, water, dried and evaporated. The residue is crystallized from hexane-ether to yield pregnan-3α,11β,17α,20β-tetrol tetra-acetate.

EXAMPLE XI

*Pregnan-11β,21-diol-3,20-dione diacetate*

Two grams of pregnan-11β,21-diol-3,20-dione were dissolved in 100 ml. of chloroform containing 1 g. of benzene sulfonic acid. Ketene is then bubbled in for an hour at room temperature after which the organic layer is washed with sodium carbonate solution, water dried, and evaporated. Crystallization of residue from aqueous methanol yields pregnan-11β,21-diol-3,20-dione diacetate.

EXAMPLE XII

*Δ⁴-pregnen-11β,21-diol-3,20-dione 11-acetate*

Hydrolysis of the 11β,21-diacetate of Example XI with either acid or alkali yields pregnan-11β,21-diol-3,20-dione 11-acetate. Bromination at C–4, followed by dehydrobromination in the usual manner, gives Δ⁴-pregnen-11β,-21-diol-3,20-dione 11-acetate (corticosterone 11-acetate).

EXAMPLE XIII

Allo-pregnan-11β-ol-3,20-dione 11-propionate

One gram of allopregnan-11β-ol-3,20-dione is dissolved in 15 ml. of propionic anhydride and 10 ml. of propionic acid. One ml. of 72% perchloric acid in 5 ml. of propionic anhydride is added, and the reaction mixture allowed to stand overnight at room temperature. After pouring into ice water, and extracting with chloroform, the organic extract is washed with sodium bicarbonate solution and then water. After drying and evaporation of the solvent, the residue upon crystallization from acetone-hexane, yields allo-pregnan-11β-ol-3,20-dione 11-propionate.

EXAMPLE XIV

Allo-pregnan-11β,17α,20β,21-tetrol-3-one tetra-acetate

Two grams of allopregnan-11β,17α,20β,21-tetrol-3-one are dissolved in 10 ml. of acetic anhydride and 10 ml. of acetic acid. One gram of trichloracetic acid is then added and the acetylation allowed to proceed at room temperature. After work-up in the usual manner, there is obtained allo-pregnan-11β,17α,20β,21-tetrol-3-one tetra-acetate crystallizable from ether.

EXAMPLE XV

Δ⁴-etiocholene-11β-ol-3,17-dione 11-acetate

One gram of Δ⁴-etiocholene-11β-ol-3,17-dione in 15 ml. of acetic anhydride and 15 ml. of acetic acid is treated with 0.5 g. of benzene sulfonic acid. Following the reaction at room temperature for the required period, the product is worked up as previously described, and there is obtained Δ⁴-etiocholene-11β-ol-3,17-dione 11-acetate.

EXAMPLE XVI

Androstan-3β,11β,17β-triol triacetate

Two grams of androstan-3β,11β,17β-triol are reacted with acetic anhydride, acetic acid and p-toluene sulfonic acid at room temperature. Dilution with water and extraction with chloroform yields androstan-3β,11β,17β-triol triacetate. Partial hydrolysis as above described, yields androstan-3β,11β,17β-triol 11-acetate.

As above indicated, the acylation reaction is generally allowed to proceed for a number of hours, preferably at room temperatures. The maximum acylation temperature is below that at which dehydration or other undesired side reaction sets in, and is generally about 50° C.

Using the procedures described in the above examples, the following further 11β-acetoxy steroids can be readily prepared: etiocholan-3α,11β,17β-triol 11-acetate and 3,11,17-triacetate; etiocholan-3α,11β-diol-17-one 11-acetate and 3,11-diacetate; etiocholan-11β-ol-3,17-dione 11-acetate; etiocholan-11β,17β-diol-3-one 11-acetate and 11,17-diacetate; Δ⁴-etiocholen-11β-17β-diol-3-one 11-acetate and 11,17-diacetate; androstan-3α,11β-diol-17-one 11-acetate and 3,11-diacetate; androstan-11β-ol-3,17-dione 11-acetate; androstan-11β,17β-diol-3-one 11-acetate and 11,17-diacetate; pregnan-3α,11β-diol-20-one 11-acetate and 3,11-diacetate; pregnan-11β-ol-3,20-dione 11-acetate; pregnan-3α,11β,20α-triol 11-acetate and 3,11,20-triacetate; pregnan-3α,11β,20β-triol 11-acetate and 3,11,20-triacetate; pregnan-11β,20α-diol-3-one 11-acetate and 11,20-diacetate; pregnan-11β,20β-diol-3-one 11-acetate and 11,20-diacetate; Δ⁴-pregnen-11β-ol-3,20-dione 11-acetate; Δ⁴-pregnen-11β, 20α-diol-3-one 11-acetate and 11,20-diacetate; Δ⁴-pregnen-11β,20β-diol-3-one 11-acetate and 11,20-diacetate; pregnan-3α,11β,17α,20β,21-penta-ol 11-acetate and penta-acetate; Δ⁴-pregnen-11β,17α,21-triol-3,20-dione 11,17-diacetate and 11,17,21-triacetate; Δ⁴-pregnen-11β,17α,20β,21-tetrol 11-acetate and tetra-acetate; pregnan-3α,11β,20β,21-tetrol 11-acetate and tetra-acetate; Δ⁴-pregnen-11β,20β,21-triol-3-one 11-acetate and triacetate; pregnan-3α,11β,17α,20β-tetrol 11-acetate and tetra-acetate; pregnan-11β,20β,21-triol-3-one 11-acetate and triacetate; pregnan-11β,17α,20β-triol-3-one 11-acetate and triacetate; Δ⁴-pregnen-11β,17α,20β-triol-3-one 11-acetate and triacetate; allopregnan-11β,20β-diol-3-one 11-acetate and diacetate; allopregnan-3α,11β,20β-triol 11-acetate and triacetate; allopregnan-3α,11β,17α,20β-tetrol 11-acetate and tetra-acetate; allopregnan-11β,17α,20β-triol-3-one 11-acetate and triacetate; allopregnan-3α,11β,20β,21-tetrol 11-acetate and tetra-acetate; allopregnan-11β,20β,21-triol-3-one 11-acetate and triacetate; 16α,17α-oxidopregnan-3α,11β,21-triol-20-one 11-acetate and 3,11,21-triacetate; 16α,17α-oxidopregnan-11β,21-diol-3,20-dione 11-acetate and 11,21-diacetate; 16α,17α-oxido-Δ⁴-pregnen-11β,21-diol-3,20-dione 11-acetate and 11,21-diacetate; 16α,17α-oxido-Δ⁴-pregnen-11β-ol-3 - one 11-acetate; and 16α,17α-oxidopregnan-11β-ol-3,20-dione 11-acetate.

By "strong acid" as employed herein is meant an acid having a dissociation constant K equal to at least $10^{-2}$. This includes the hydrohalic acids, like hydrochloric acid, which are generally not as satisfactory as those named hereinabove. The acid employed should, however, not be one which will oxidize the 11β-hydroxyl. For best results, as already indicated, the acylation of the 11β-hydroxyl should take place at approximately room temperature.

Variations from the specific procedures set out hereinabove may be resorted to within the scopes of the appended claims without departing from the spirit of the invention. Thus, to prepare Δ⁴-pregnen-11β,17α,21-triol-3,20-dione 11,17,21-triacetate (or other ester), compound VIII or IX can be further acylated in known manner; while to produce the 11,17-diacetate, the triacetate can be partially hydrolyzed at room or slightly elevated temperatures with sodium carbonate.

We claim:

1. Process for the manufacture of Δ⁴-pregnen-11β,17α,21-triol-3,20-dione 11-acetate, which comprises reacting pregnan-3α,11β,17α-triol-20-one with an acetylating agent at room temperature in the presence of a strong acid, partially hydrolyzing the resulting triacetate to the 11β-acetoxy-3α,17α-diol, introducing bromine into the 21-position, replacing the 21-bromo group with a member of the class consisting of acyloxy and hydroxyl groups, the acyloxy group being that of a lower aliphatic carboxylic acid, oxidizing the 3-secondary hydroxyl to a keto group, class consisting of acyloxy and hydroxyl groups, oxidizing the 3-secondary hydroxyl to a keto group, introducing bromine into the 4-position of the 3,20-dione and dehydrobrominating and hydrolyzing the 21-acyloxy group when present.

2. Process for the manufacture of Δ⁴-pregnen-11β,17α-diol-3,20-dione 11-acetate which comprises reacting pregnan-3α,11β-17α-triol-20-one with an acetylating agent at room temperature in the presence of a strong acid, partially hydrolyzing the triacetate to the 11β-acetoxy-3α,17α-diol, oxidizing the 3-secondary hydroxyl group to a keto group, introducing bromine into the 4-position and dehydro-brominating the resulting 4-bromo-pregnan-11β,17α-diol-3,20-dione 11-acetate.

3. Process for the manufacture of an 11β-acetoxy-20-keto steroid of the normal and allo-pregnane series having no other substituent in the C-ring, which comprises reacting an 11β-hydroxy-20-keto steroid of the normal and allo-pregnane series having no other substituents in the C-ring with an acetylating agent at room temperature and in the presence of a free strong acid.

4. A compound of the group consisting of normal and allo-pregnanes of the formula:

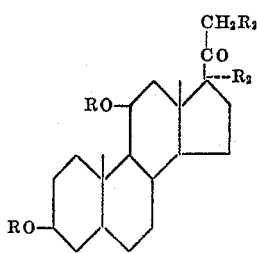

and pregnenes of the formula

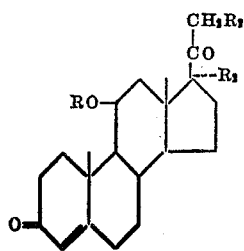

wherein RO is a lower alkanoyloxy group, and $R_2$ is a member of the class consisting of H, OH, and lower alkanoyloxy and benzoyloxy groups.

5. $\Delta^4$-pregnen-11β,17α,21-triol-3,20-dione 11-acetate.
6. $\Delta^4$-pregnen-11β,17α,21-triol-3,20-dione 11,17-diacetate.
7. $\Delta^4$-pregnen-11β,17α,21-triol-3,20-dione 11,21-diacetate.
8. $\Delta^4$-pregnen-11β,17α,21-triol-3,20-dione 11,17,21-triacetate.

References Cited in the file of this patent
UNITED STATES PATENTS 2,183,589    Reichstein _____ Dec. 19, 1939

OTHER REFERENCES

Reichstein: Helv. Chim. Acta 19, 37–38 (1936).
Fieser et al.: Natural Products Related to Phenanthrene, 3rd ed., pp. 407, 425–26 (1949).